(12) United States Patent
Wang et al.

(10) Patent No.: US 10,616,351 B2
(45) Date of Patent: Apr. 7, 2020

(54) DETERMINING ACCURACY OF CHARACTERISTICS ASSERTED TO A SOCIAL NETWORKING SYSTEM BY A USER

(71) Applicant: Facebook, Inc., Menlo Park, CA (US)

(72) Inventors: Weidong Wang, San Jose, CA (US); Roshan Umesh Goli, Redwood City, CA (US); Patrick James Kemp, Menlo Park, CA (US); Spencer Powell, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 967 days.

(21) Appl. No.: 14/849,555

(22) Filed: Sep. 9, 2015

(65) Prior Publication Data

US 2017/0068722 A1 Mar. 9, 2017

(51) Int. Cl.
*H04L 29/08* (2006.01)
*G06Q 50/00* (2012.01)
*G06Q 30/02* (2012.01)
*H04W 4/21* (2018.01)

(52) U.S. Cl.
CPC ......... *H04L 67/20* (2013.01); *G06Q 30/0201* (2013.01); *G06Q 50/01* (2013.01); *H04L 67/306* (2013.01); *H04W 4/21* (2018.02)

(58) Field of Classification Search
None
See application file for complete search history.

(56) References Cited

U.S. PATENT DOCUMENTS

| | | | | |
|---|---|---|---|---|
| 5,872,850 A | * | 2/1999 | Klein | G06F 16/30 705/51 |
| 6,112,186 A | * | 8/2000 | Bergh | G06Q 30/02 705/7.32 |
| 7,689,556 B2 | * | 3/2010 | Garg | G06Q 30/02 707/765 |
| 8,316,086 B2 | * | 11/2012 | Ufford | G06Q 10/107 705/319 |
| 8,626,697 B1 | * | 1/2014 | Chaine | G06F 16/957 706/50 |
| 10,296,546 B2 | * | 5/2019 | Chhaya | G06F 16/337 |
| 2006/0173838 A1 | * | 8/2006 | Garg | G06Q 30/02 |
| 2009/0228294 A1 | * | 9/2009 | Choi | G06Q 30/018 705/317 |

(Continued)

*Primary Examiner* — Jeff A Burke
*Assistant Examiner* — Edward Jacobs
(74) *Attorney, Agent, or Firm* — Fenwick & West LLP

(57) ABSTRACT

A social networking system maintains characteristics with its users, with various characteristics, such as age, specified by the users (i.e., "asserted characteristics"). The social networking system selects content for a user based at least in part on the characteristics associated with the user. To account for potential inaccuracies in an asserted age of a user, the social networking system clusters users based on ages of other users connected to users. The online system receives verified ages for users in a cluster from a trusted third party system that maintains more accurate characteristics for users than the social networking system. By comparing the asserted ages for users in the cluster to the verified ages for users in the cluster, the social networking system determines an accuracy of the asserted ages for users in the cluster. The accuracy may be used when selecting content for the users.

20 Claims, 2 Drawing Sheets

(56) References Cited

U.S. PATENT DOCUMENTS

| | | | | |
|---|---|---|---|---|
| 2010/0082360 A1* | 4/2010 | Chien | G06Q 30/02 | 705/14.53 |
| 2010/0250676 A1* | 9/2010 | Ufford | G06Q 10/107 | 709/204 |
| 2011/0246574 A1* | 10/2011 | Lento | G06Q 10/10 | 709/204 |
| 2012/0047560 A1* | 2/2012 | Underwood | G06Q 10/06 | 726/4 |
| 2012/0066502 A1* | 3/2012 | Borneman | G06F 21/41 | 713/176 |
| 2012/0110071 A1* | 5/2012 | Zhou | G06Q 10/10 | 709/204 |
| 2012/0166285 A1* | 6/2012 | Shapiro | G06O 30/0251 | 705/14.58 |
| 2012/0209706 A1* | 8/2012 | Ramer | G06Q 30/02 | 705/14.51 |
| 2013/0013682 A1* | 1/2013 | Juan | G06Q 50/01 | 709/204 |
| 2013/0031470 A1* | 1/2013 | Daly, Jr. | G06F 17/211 | 715/243 |
| 2013/0103637 A1* | 4/2013 | Dror | G06F 16/367 | 707/602 |
| 2014/0236953 A1* | 8/2014 | Rapaport | G06Q 10/10 | 707/740 |
| 2014/0257919 A1* | 9/2014 | Forman | G06Q 30/0201 | 705/7.29 |
| 2014/0324544 A1* | 10/2014 | Donato | G06Q 30/0204 | 705/7.33 |
| 2014/0365408 A1* | 12/2014 | Snyder | G06F 19/00 | 706/12 |
| 2015/0088662 A1* | 3/2015 | Noller | G06Q 30/02 | 705/14.66 |
| 2015/0106467 A1* | 4/2015 | Robarts | G06Q 10/107 | 709/207 |
| 2015/0112812 A1* | 4/2015 | Weinsberg | G06N 5/00 | 705/14.66 |
| 2015/0213492 A1* | 7/2015 | Aleksandrovsky | G06Q 30/0255 | 705/14.53 |
| 2015/0332087 A1* | 11/2015 | Joshi | G06K 9/00 | 382/203 |
| 2015/0339754 A1* | 11/2015 | Bloem | G06Q 30/0631 | 705/26.7 |
| 2015/0343313 A1* | 12/2015 | Kaleta | G06Q 30/0609 | 463/29 |
| 2015/0350151 A1* | 12/2015 | Graham | G06F 16/438 | 709/206 |
| 2016/0057499 A1* | 2/2016 | Foerster | H04N 21/4758 | 705/319 |
| 2016/0147758 A1* | 5/2016 | Chhaya | G06F 16/9535 | 707/733 |

* cited by examiner

DETERMINING ACCURACY OF CHARACTERISTICS ASSERTED TO A SOCIAL NETWORKING SYSTEM BY A USER

BACKGROUND

This disclosure relates generally to presenting content to users of a social networking system, and more specifically selecting content for a social networking system user based at least in part on an accuracy of an age asserted by a user of the social networking system user.

A social networking system allows its users to connect to and to communicate with other users. Users may create profiles on a social networking system that are tied to their identities and include information about the users, such as interests and demographic information. The users may be individuals or entities such as corporations or charities. Because of the increasing popularity of social networking systems and the significant amount of user-specific information maintained by social networking systems, a social networking system allows users to easily communicate information about themselves to other users and share content with other users.

Many social networking systems maintain characteristics associated with their users and select content for presentation to various users based on the characteristics associated with the users. Various characteristics associated with a user may be asserted by the user to a social networking system. For example, a user asserts an age to the social networking system, which stores the age in association with the user. However, users may fail to assert certain characteristics to a social networking system or may assert inaccurate characteristics to the social networking system. For example, a user asserts an age to the social networking system different than the user's actual age. Inaccuracies in characteristics associated with users by the social networking system impair selection of content for the users by the social networking system. For example, inaccurate characteristics associated with a user cause the social networking system to erroneously identify content for presentation to the user or to erroneously exclude content from being evaluated for presentation to the user.

SUMMARY

A social networking system maintains information describing various characteristics of its users as well as connections between users and other users. For example, the social networking system maintains a user profile associated with a user that includes various characteristics of the user. In many embodiments, the social networking system maintains an age associated with various users. When selecting content for presentation to a user, the social networking system accounts for characteristics of the user to increase a likelihood of the user being presented with content likely to be of interest. Accordingly, various content items may be associated with targeting criteria identifying characteristics of users eligible to be presented with the content items, allowing an entity associated with a content item to leverage information associated with users by the social networking system to specify presentation of the content item to users having particular characteristics. For example, the social networking system selects candidate content items as content items associated with at least a threshold number of targeting criteria satisfied by characteristics associated with the user by the social networking system.

However, various characteristics associated with a user by the social networking system are specified by the user (also referred to as "asserted characteristics"), and the user may provide an inaccurate characteristic or fail to provide a characteristic. For example, the social networking system maintains an age associated with a user that is specified by the user or determined based on a birthday provided by the user; the user may provide an inaccurate age or birthday or fail to specify an age or a birthday. In the preceding example, using the age based on information specified by the user (the "asserted age" of the user) when selecting content for the user may prevent the social networking system from identifying content items eligible for presentation to the user because the asserted age of the user does not satisfy targeting criteria associated with the content item. Similarly, the social networking system may incorrectly identify a content item as eligible for presentation to the user because the asserted age of the user satisfies targeting criteria associated with the content item. This reduces the likelihood of the user being presented with content items in which the user is likely to interact and may prevent certain content items in which the user may be interested in being presented to users, which may also decrease the likelihood of entities subsequently providing content items to the social networking system for presentation to users.

To compensate for potential discrepancies between an asserted age of a user and the user's actual age, the social networking system determines an accuracy of the asserted age based at least in part on ages of other users to whom the user is connected via the social networking system. The social networking identifies other users to whom the user is connected via the social networking system and identifies ages associated with the other users connected to the user. For multiple users, the social networking system determines a distribution of ages associated with other users connected to the user via the social networking system. In various embodiments, the social networking system 140 maintains multiple age ranges and determines the distribution of ages associated with other users connected to a user by identifying a number of other users connected to the user with whom the social networking system maintains an age within an age range. The age ranges are non-overlapping in various embodiments so an age associated another user connected to the user is within a single age range. For example, the social networking system maintains non-overlapping age ranges each covering 10 years and associates a distribution with the user identifying a number or a percentage of other users connected to the user associated with an age that is within each age range. In some embodiments, the online system maintains different age ranges, allowing the online system to determine different distributions of ages associated with other users connected to the user for users having different characteristics (e.g., users associated with a particular location, users associated with a particular gender, etc.) or for use when selecting different types of content (e.g., a distribution of ages including more specific age ranges for selecting advertisements and another distribution of ages including broader age ranges for selecting content generated by the online system).

In various embodiments, the social networking system determines the distribution of ages associated with the other users connected to a user by generating a vector for the user, where each dimension of the vector specifies a number or a percentage of the other users connected to the user within an age range. For example, the social networking system applies a clustering algorithm to the vectors associated with each user based on the ages of other users connected to the users, the social networking system clusters the users into various clusters. For example, a clustering algorithm generates clusters of users based on distances between vectors associated with the various users. The social networking system may generate a specified number of clusters (e.g., a number of clusters specified by information stored by the social networking system) or generate a number of clusters until centroids of different clusters are separated by less than a threshold distance. Hence, different clusters of users include users who are connected to other users having similar distributions of ages. The distribution of ages of other users connected to a user provides information relevant to an accuracy of the user's asserted age, as a user is likely to have a larger number of connections to other users having ages similar to an age of the user. In other embodiments, the social networking system determines any other suitable characteristic of the user capable of providing information relevant to the accuracy of the user's asserted age and clusters the users based on the characteristic, allowing the social networking system to generate clusters of users each including users with a similar characteristic that provides information relevant to the accuracy of the user's asserted age (or of another characteristic of the user).

For each of the clusters, the social networking system receives information from a trusted third party system describing verified ages of at least a subset of users in a cluster. A trusted third party system maintains information associated with users having a higher likelihood of being accurate than information associated with users by the social networking system. For example, a trusted third party system includes information provided by users to multiple sources or includes information provided by a user to one or more particular organizations or entities (e.g., census information provided by users). As another example, a trusted third party system obtains information from a panel of users for whom the third party system has verified characteristics. Hence, the verified ages received from the trusted third party system are more likely to accurately identify actual ages of the users.

Based on the verified ages received from the trusted third party system and the asserted ages included in user profiles of the users maintained by the social networking system, the social networking system determines an accuracy of the asserted ages for the subset of users in the cluster. For example, the social networking system compares asserted ages from the subset of users in the cluster to verified ages of the subset of users in the cluster and determines an accuracy of the asserted ages of users in the subset as a percentage of users in the subset of the cluster having asserted ages that match verified ages from the trusted third party system. The social networking system stores the determined accuracy in association with the cluster. Accuracies for each cluster are stored in association with the clusters by the social networking system, allowing the social networking system to maintain a measure of the accuracies of asserted ages associated with users in the cluster. Determining the accuracies for various clusters allows the social networking system to identify clusters of users having higher or lower accuracies relative to other clusters. This allows the social networking system to identify an accuracy of a user's asserted age based on the cluster to which the user belongs, improving content selection for the user by accounting for the likely accuracy of the user's asserted age reflecting the user's actual age.

The social networking system allows users or third party systems to use accuracies of asserted ages by users as targeting criteria for content items in addition to an asserted age associated with the user, or the social networking system otherwise uses accuracies of asserted ages of users when selecting content for presentation to various users. For example, targeting criteria associated with a content item by a user, by a third party system, or by the social networking system specifies a threshold accuracy of an asserted age by a user, so the content item is eligible for presentation to the user if the accuracy for the asserted age provided by the user equals or exceeds the threshold accuracy. When the social networking system identifies an opportunity to present content to a viewing user, the social networking system identifies a cluster including the viewing user and determines an accuracy associated with the cluster. Hence, the accuracy of the cluster including the viewing user represents an accuracy of the asserted age provided to the social networking system by the viewing user. The social networking system includes the content item in one or more selection processes for presentation to the user in response to determining the accuracy of the cluster including the user equals or exceeds a threshold accuracy associated with the content item and determining an asserted age of the user satisfies one or more criteria associated with the user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
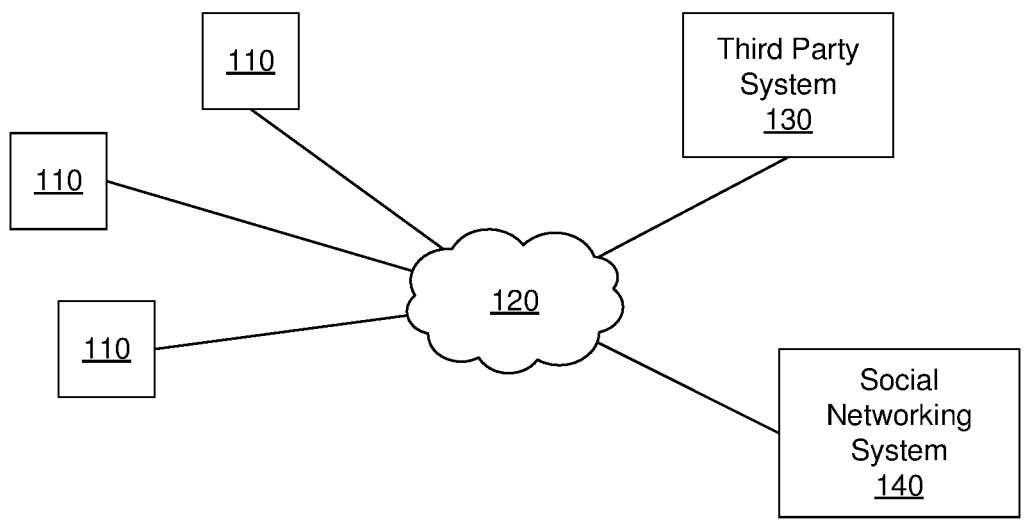
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

A third party system 130 coupled to the network 120 may be a trusted third party system 130 maintaining information associated with users having a higher likelihood of being accurate than information associated with users by the social networking system 140. For example, a trusted third party system 130 includes information provided by users to multiple sources or includes information provided by a user to one or more particular organizations or entities (e.g., census information provided by users). As another example, a trusted third party system 130 obtains information from a panel of users for whom the third party system 130 has verified characteristics of the users on the panel. Hence, characteristics of users maintained by a trusted third party system 130 are considered "verified characteristics" relative to characteristics of users maintained by the social networking system 140 because of the relatively higher likelihood of the characteristics maintained by the trusted third party system 130 being accurate.

Figure 2:
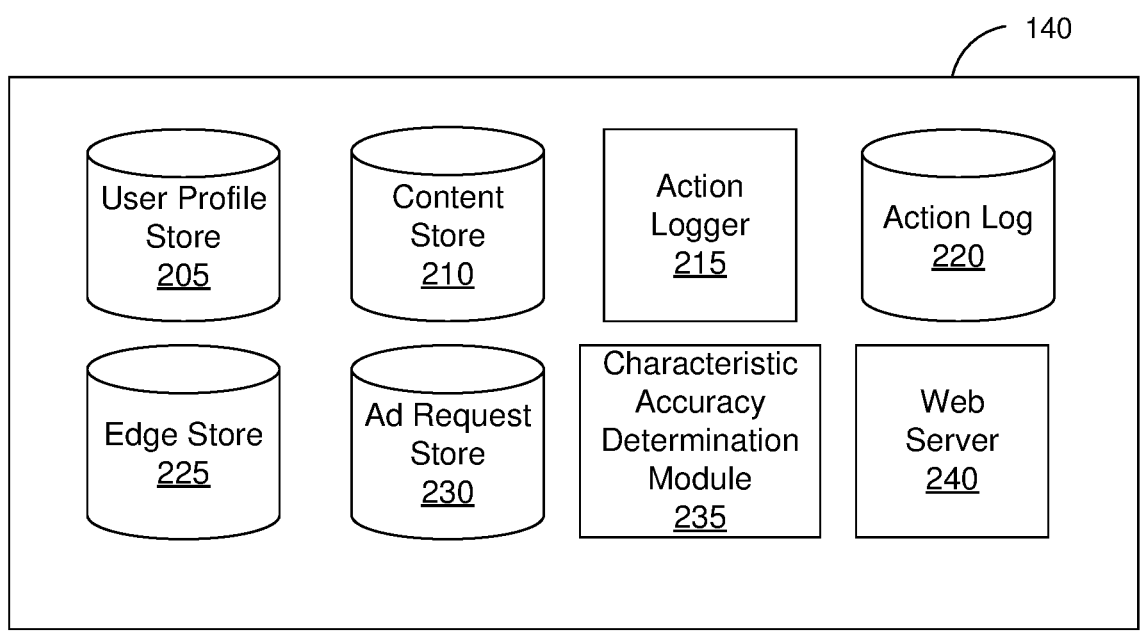
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, an advertisement request ("ad request") store 230, a characteristic accuracy determination module 235, a content selection module 240, and a web server 245. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

A user profile for a user of the social networking system 140 includes various characteristics that are specified or provided to the social networking system 140 by the user. These characteristics are referred to herein as "asserted characteristics." For example, a user specifies an age to the social networking system 140, which stores the age in the user profile corresponding to the user. As another example, the user specifies a birthday to the social networking system 140, which determines an age associated with the user based on the birthday specified by the user. In the preceding examples, the age associated with the user in the user profile is an "asserted age" as it is based on information specified by the user. Various other characteristics may be determined based on information specified to the social networking system by the user 140. Additionally, characteristics in a user profile inferred by the social networking system 140 may also be identified as "asserted characteristics." Inferring characteristics for a user profile is further described in conjunction with U.S. patent application Ser. No. 12/916,322, filed on Oct. 29, 2010, which is hereby incorporated by reference in its entirety. Because asserted characteristics are based on information provided by the user, they may be inaccurate or incomplete. For example, a user specifies an age or a location different from an actual age or location of the user, so the user profile associated with the user maintains an inaccurate age or inaccurate location associated with the user. Alternatively, a user does not provide information to the social networking system 140 with information for an asserted characteristic, preventing the user profile associated with the user from including the asserted characteristic.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system 140 using a brand page associated with the entity's user profile. Other users of the social networking system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the social networking system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or in another user in the social networking system 140 based on the actions performed by the user. A user's affinity may be computed by the social networking system 140 over time to approximate the user's interest in an object, in a topic, or in another user in the social networking system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser.

No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An advertisement request includes advertisement content, also referred to as an "advertisement" and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an ad request by an advertiser and is used to determine an expected value, such as monetary compensation, provided by an advertiser to the social networking system 140 if advertisement content in the ad request is presented to a user, if the advertisement content in the ad request receives a user interaction when presented, or if any suitable condition is satisfied when advertisement content in the ad request is presented to a user. For example, the bid amount specifies a monetary amount that the social networking system 140 receives from the advertiser if advertisement content in an ad request is displayed. In some embodiments, the expected value to the social networking system 140 of presenting the advertisement content may be determined by multiplying the bid amount by a probability of the advertisement content being accessed by a user.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the social networking system 140. Targeting criteria may also specify interactions between a user and objects performed external to the social networking system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows advertisers to further refine users eligible to be presented with advertisement content from an advertisement request. As another example, targeting criteria identifies users having a connection to another user or object or having a particular type of connection to another user or object.

The characteristic accuracy determination module 235 determines an accuracy of one or more asserted characteristics included in various user profiles maintained in the user profile store 205. As described above, asserted characteristics included in a user profile are based on information provided to the social networking system 140 by a user associated with the user profile, so an accuracy of an asserted characteristic is based on the information provided to the social networking system 140 by the user. However, certain asserted characteristics of a user may be similar to asserted characteristics associated with other users connected to the user. For example, a user may be likely to have connections via the social networking system 140 to other users with similar ages to the user, allowing the characteristic accuracy determination module 235 to determine an accuracy of the user's asserted age based on ages associated with other users connected to the user. As another example, the characteristic accuracy determination module 235 may determine an accuracy of a location asserted by the user (e.g., a hometown) based on locations associated with other users connected to the user via the social networking system 140.

As further described below in conjunction with FIG. 3, to determine an accuracy of an asserted characteristic associated with a user, the characteristic accuracy determination module 235 identifies other users connected to the user via the edge store 225 and determines a distribution of the asserted characteristic of the other users connected to the user. In various embodiments, the characteristic accuracy determination module 235 maintains multiple non-overlapping ranges for a characteristic (e.g., multiple age ranges if the characteristic is an asserted age) and determines the distribution of the characteristic associated with other users connected to a user by identifying a number of other users connected to the user having user profiles including the characteristic within different ranges. As an example, the characteristic accuracy determination module 235 associates a distribution with the user identifying a number or a percentage of other users connected to the user associated with a characteristic within each range. The characteristic accuracy determination module 235 determines distributions of the characteristic for various users based on the characteristic associated with other users connected to the various users and clusters the various users into multiple clusters based on the distributions associated with the users. In various embodiments, the characteristic accuracy determination module 235 determines a vector associated with each user based on the distribution of the characteristic associated with other users connected to a user. Each dimension of a vector associated with the user specifies a number or a percentage of the other users connected to the user having the characteristic within a range. For example, if the characteristic accuracy determination module 235 identifies 5 ranges for the characteristic, the vector associated with a user has 5 dimensions each based on a number or a percentage of other users connected to the user having the characteristic within a range corresponding to a dimension. The characteristic accuracy determination module 235 applies a clustering algorithm to the vectors associated with each of the various users to cluster the users into multiple clusters. For example, a clustering algorithm generates clusters of users based on distances between vectors associated with various users. The characteristic accuracy determination module 235 may generate a specified number of clusters (e.g., a number of clusters specified by information stored by the characteristic accuracy determination module 235) or may generate a number of clusters until centroids of different clusters are separated by less than a threshold distance, where a centroid of a cluster is an average of an average of the vectors associated with users in the cluster. Hence, different clusters of users include users associated with vectors having small distances between them, indicating the users in a cluster who are connected to other users having similar distributions of the characteristic.

For each of the clusters, the characteristic accuracy determination module 235 retrieves information from a trusted third party system 130 describing verified characteristics of at least a subset of users in a cluster. A trusted third party system 130 maintains information associated with users having a higher likelihood of being accurate than information associated with users by the social networking system 140. For example, a trusted third party system 130 includes information provided by users to multiple sources or includes information provided by a user to one or more particular organizations or entities (e.g., census information provided by users). As another example, a trusted third party system 130 obtains information from a panel of users for whom the third party system 130 has verified characteristics. Hence, the verified ages received from the trusted third party system 130 are more likely to be accurate characteristics of the users.

By comparing the characteristic associated with various users in the subset of users in a cluster to the verified characteristic associated with the users in the subset of users received from the trusted third party system 130, the characteristic accuracy determination module 235 determines an accuracy of the cluster. In some embodiments, for each user included in the subset of users in the cluster, the social networking system 140 compares the characteristic associated with a user by the social networking system 140 to a verified characteristic associated with the user by the trusted third party system 130. The characteristic accuracy determination module 235 determines the accuracy of the characteristic associated with users in the cluster (the asserted characteristic associated with the users) by the social networking system 140 as a percentage of users in the subset of the cluster having the asserted characteristic matching the verified characteristic of the users from the trusted third party system 130. The characteristic accuracy determination module 235 stores information identifying the cluster, identifying the users included in the cluster, and the determined accuracy in association with the cluster. Accuracies for each cluster are determined and stored along with information identifying each cluster and identifying users included in each cluster, allowing the characteristic accuracy determination module 235 to maintain a measure of the accuracies of asserted characteristics associated with users in various clusters, as further described below in conjunction with FIG. 3.

The content selection module 240 selects one or more content items for communication to a client device 110 to be presented to a user. Content items eligible for presentation to the user are retrieved from the content store 210, from the ad request store 230, or from another source by the content selection module 240, which selects one or more of the content items for presentation to the viewing user. A content item eligible for presentation to the user is a content item associated with at least a threshold number of targeting criteria satisfied by characteristics of the user or is a content item that is not associated with targeting criteria. The content selection module 240 may account for an accuracy of a characteristic associated with a user when determining whether a content item is eligible for presentation to a user. For example, to determine whether an asserted characteristic associated with the user satisfies targeting criteria associated with a content item, the content selection module 240 retrieves an accuracy of the asserted characteristic associated with the user from the characteristic accuracy determination module 235. If the asserted characteristic satisfies the targeting criteria and the accuracy of the asserted characteristic equals or exceeds a threshold value, the content selection module 240 determines the asserted characteristic satisfies the targeting criteria and identifies the content item as eligible for presentation to the user. However, if the accuracy of the asserted characteristic is less than the threshold value and the asserted characteristic satisfies the targeting criteria, the content selection module 240 determines the content item is ineligible for presentation to the user, as further described below in conjunction with FIG. 3. The content selection module 240 may maintain the threshold value for the accuracy of the asserted characteristic or the targeting criteria associated with the content item may specify the threshold value for the accuracy of the asserted characteristic. In various embodiments, the content selection module 240 includes content items eligible for presentation to the user in one or more selection processes, which identify a set of content items for presentation to the user. For example, the content selection module 240 determines measures of relevance of various content items to the user based on characteristics associated with the user by the social networking system 140 and based on the user's affinity for different content items. Based on the measures of relevance, the content selection module 240 selects content items for presentation to the user. As an additional example, the content selection module 240 selects content items having the highest measures of relevance or having at least a threshold measure of relevance for presentation to the user. Alternatively, the content selection module 240 ranks content items based on their associated measures of relevance and selects content items having the highest positions in the ranking or having at least a threshold position in the ranking for presentation to the user.

Content items eligible for presentation to the user may include advertisements from ad requests or other content items associated with bid amounts. The content selection module 240 uses the bid amounts associated with ad requests when selecting content for presentation to the user. In various embodiments, the content selection module 240 determines an expected value associated with various ad requests (or other content items) based on their bid amounts and selects content items associated with a maximum expected value or associated with at least a threshold expected value for presentation. An expected value associated with an ad request or with a content item represents an expected amount of compensation to the social networking system 140 for presenting an ad request or a content item. For example, the expected value associated with an ad request is a product of the ad request's bid amount and a likelihood of the user interacting with the ad content from the ad request. The content selection module 240 may rank ad requests based on their associated bid amounts and select ad requests having at least a threshold position in the ranking for presentation to the user. In some embodiments, the content selection module 240 ranks both content items not associated with bid amounts and ad requests in a unified ranking based on bid amounts associated with ad requests and measures of relevance associated with content items and ad requests. Based on the unified ranking, the content selection module 240 selects content for presentation to the user. Selecting ad requests and other content items through a unified ranking is further described in U.S. patent application Ser. No. 13/545,266, filed on Jul. 10, 2012, which is hereby incorporated by reference in its entirety.

For example, the content selection module 240 receives a request to present a feed of content to a user of the social networking system 140. The feed may include one or more advertisements as well as content items, such as stories describing actions associated with other online system users connected to the user. The content selection module 240 accesses one or more of the user profile store 205, the content store 210, the action log 220, and the edge store 225 to retrieve information about the user. For example, information describing actions associated with other users connected to the user or other data associated with users connected to the user are retrieved. Additionally, one or more advertisement requests ("ad requests") may be retrieved from the ad request store 230. The retrieved content items or ad requests are analyzed by the content selection module 240 to identify candidate content items, including ad requests, eligible for presentation to the user. For example, content items associated with users who not connected to the user or stories associated with users for whom the user has less than a threshold affinity are discarded as candidate content items. Based on various criteria, the content selection module 240 selects one or more of the content items or ad requests identified as candidate content for presentation to the identified user. The selected content items or advertisements from selected ad requests are included in a feed of content that is presented to the user. For example, the feed of content includes at least a threshold number of content items describing actions associated with users connected to the user via the social networking system 140.

In various embodiments, the content selection module 240 presents content to a user through a newsfeed including a plurality of content items selected for presentation to the user. One or more advertisements may also be included in the feed. The content selection module 240 may also determine the order in which selected content items or advertisements are presented via the feed. For example, the content selection module 240 orders content items or advertisements in the feed based on likelihoods of the user interacting with various content items or advertisements.

The web server 245 links the social networking system 140 via the network 120 to the one or more client devices 110, as well as to the one or more third party systems 130. The web server 245 serves web pages, as well as other content, such as JAVA®, FLASH®, XML and so forth. The web server 245 may receive and route messages between the social networking system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 245 may provide application programming interface (API) functionality to send data directly to native client device operating systems, such as IOS®, ANDROID™, WEBOS® or BlackberryOS.

Figure 3:
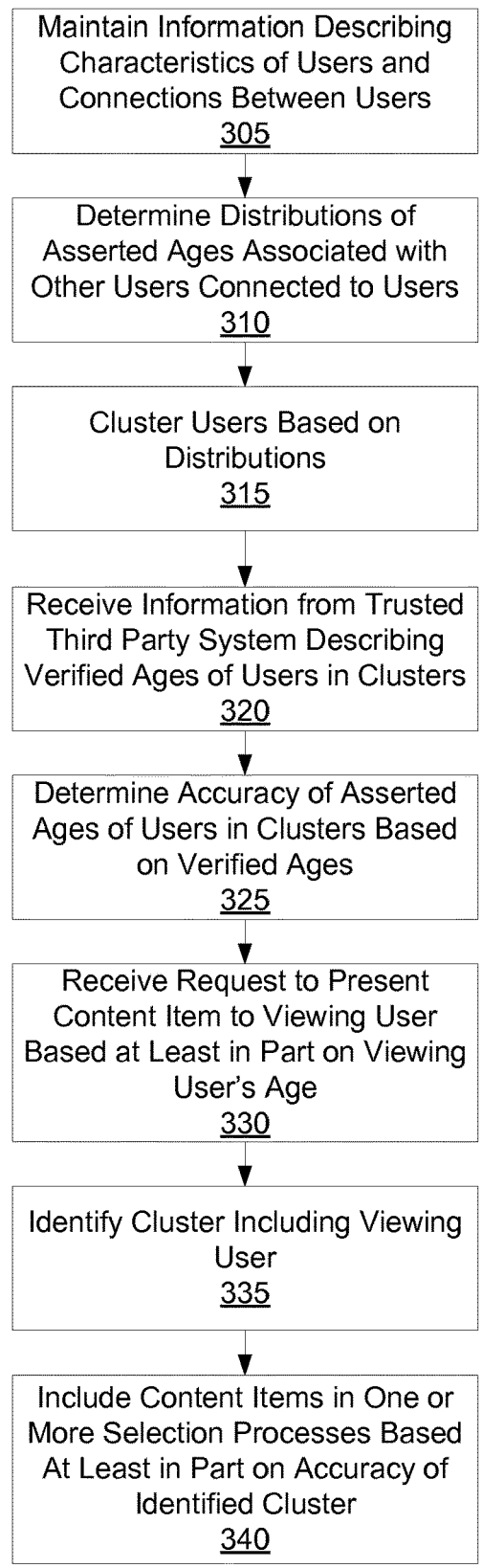
FIG. 3 is a flowchart of a method for determining an accuracy of an age asserted to a social networking system by a user of the social networking system, in accordance with an embodiment.

Determining Accuracy of Characteristics Asserted by a Social Networking System User FIG. 3 is a flowchart of a method for determining an accuracy of an age asserted to a social networking system 140 by a user of the social networking system 140. In various embodiments, the method includes different and/or additional steps than those described in conjunction with FIG. 3. Additionally, steps of the method may be performed in different orders than the order described in conjunction with FIG. 3 in some embodiments.

The social networking system 140 maintains 305 information describing various characteristics of its users as well as connections between users and other users. As described above in conjunction with FIG. 2, the social networking system 140 maintains 305 connections between the user and various other users of the social networking system. Additionally, the social networking system 140 maintains 305 a user profile associated with a user that includes various characteristics of the user, such as demographic information, interests, or other information declared to the social networking system 140 by the user. The user profile associated with the user includes an age associated with the user. In various embodiments, the user profile includes an age asserted to the social networking system 140 by the user (also referred to as an "asserted age"), as well as other characteristics asserted to the social networking system 140 by the user (also referred to as "asserted characteristics"). However, the user may provide inaccurate information for an asserted characteristic or fail to provide information for an asserted characteristic. For example, the social networking system 140 maintains 305 an age associated with a user that is asserted by the user or that is determined by the social networking system 140 based on a birthday asserted by the user; if the user asserts an inaccurate age or birthday, the age maintained by the social networking system 140 for the user is not the actual age of the user. As another example, the user does not assert an age or a birthday to the social networking system 140, preventing the social networking system 140 from maintaining 305 an age associated with the user.

As the social networking system 140 selects content for presentation to a user based at least in part on characteristics of the user, maintaining 305 inaccurate characteristics for the user may cause the social networking system 140 to provide the user with less relevant content. For example, if the social networking system 140 maintains 305 an inaccurate age associated with the user, the social networking system 140 may identify content items that are less relevant to the user, and less likely to be interacted with by the user, because the inaccurate age associated with the user satisfies targeting criteria associated with the content item. Similarly, the social networking system 140 may fail to identify other content items that are likely to be relevant to the user because the inaccurate age associated with the user does not satisfy targeting criteria associated with the other content items. If the social networking system 140 receives compensation from various entities for user interactions with content items provided by the entity, presenting the user with content items with which the user is unlikely to interact or failing to identify content items relevant to the user reduces revenue received by the social networking system 140.

To compensate for potential discrepancies between an asserted age associated with a user and the user's actual age, the social networking system 140 determines an accuracy of the asserted age associated with the user based at least in part on ages maintained by the social networking system 140 for other users connected to the user via the social networking system 140. For multiple users, the social networking system 140 determines 310 a distribution of ages associated with other users connected to the user via the social networking system 140. In various embodiments, the social networking system 140 maintains multiple age ranges and determines 310 the distribution of ages associated with other users connected to a user by identifying a number of other users connected to the user with whom the social networking system 140 maintains an age within an age range. The age ranges are non-overlapping in various embodiments so an age associated another user connected to the user is within a single age range. For example, the social networking system 140 maintains non-overlapping age ranges each covering 10 years and associates a distribution with the user identifying a number or a percentage of other users connected to the user associated with an age that is within each age range. In some embodiments, the online system 140 maintains different age ranges, allowing the online system 140 to determine 310 different distributions of ages associated with other users connected to the user for users having different characteristics (e.g., users associated with a particular location, users associated with a particular gender, etc.) or for use when selecting different types of content (e.g., a distribution of ages including more specific age ranges for selecting advertisements and another distribution of ages including broader age ranges for selecting content generated by the online system 140).

Based on the distributions of ages associated with other users connected to various users, the social networking system 140 clusters 315 users into various clusters. In various embodiments, the social networking system 140 determines a vector associated with each user based on the distribution of ages associated with other users connected to a user. Each dimension of a vector associated with the user specifies a number or a percentage of the other users connected to the user within an age range. For example, if the social networking system 140 identifies 10 age ranges, the vector associated with the user has 10 dimensions each based on a number or a percentage of other users connected to the user within an age range corresponding to a dimension. The social networking system 140 applies a clustering algorithm to the vectors associated with each user to cluster 315 the users into various clusters. For example, a clustering algorithm generates clusters of users based on distances between vectors associated with various users. In some embodiments, the social networking system 140 applies a k-means clustering algorithm to the vectors associated with various users to cluster 315 the users. The social networking system 140 may generate a specified number of clusters (e.g., a number of clusters specified by information stored by the social networking system 140) or may generate a number of clusters until centroids of different clusters are separated by less than a threshold distance, where a centroid of a cluster is an average of an average of the vectors associated with users in the cluster. Hence, different clusters of users include users associated with vectors having small distances between them, indicating the users in a cluster who are connected to other users having similar distributions of ages.

In some embodiments, the social networking system 140 identifies a set of users having a common characteristic and clusters 315 users within the set based on the vectors associated with the users, as described above. For example, the social networking system 140 identifies a set of users having a common gender or a common location and clusters 315 user in the set into various clusters based on the distributions of ages of other users connected to the users in the set, as further described above. The social networking system 140 may identify various sets each including users having a different common characteristic and cluster 315 users in each set into clusters of users having a common characteristic corresponding to a set.

For each of the clusters, the social networking system 140 receives 320 information from a trusted third party system 130 describing verified ages of at least a subset of users in a cluster. A trusted third party system 130 maintains information associated with users having a higher likelihood of being accurate than information associated with users by the social networking system 140. For example, a trusted third party system 130 includes information provided by users to multiple sources or includes information provided by a user to one or more particular organizations or entities (e.g., census information provided by users). As another example, a trusted third party system 130 obtains information from a panel of users for whom the third party system 130 has verified characteristics. Hence, the verified ages received 320 from the trusted third party system 130 are more likely to accurately identify actual ages of the users. In various embodiments, the social networking system 140 maintains a cluster identifier associated with each cluster, with a cluster identifier uniquely identifying a cluster. To receive 320 information from the trusted third party system 130 describing the verified ages of the subset of users in the cluster, the social networking system 140 retrieves information maintained by the social networking system 140 identifying one or more users in the cluster to the trusted third party system 130 and communicates the retrieved information identifying the users to the trusted third party system 130, which communicates verified ages associated with users corresponding to the information identifying the one or more users in the cluster to the social networking system 140. In some embodiments, the social networking system 140 communicates the cluster identifier to the trusted third party system 130 along with the information identifying users in the cluster to the trusted third party system 130, and the trusted third party system 130 includes the cluster identifier in the information provided to the social networking system 140, allowing the social networking system 140 to more identify the cluster including the users identified to the trusted third party system 130.

In other embodiments, the social networking system 140 provides a cluster identifier to users in a cluster for storage by client devices 110 associated with the users. A client device 110 may communicate the cluster identifier of a cluster and information stored on the client device 110 identifying a user in the cluster to the trusted third party system 130. For example, content presented by the client device 110 includes instructions that, when executed by the client device 110, communicate the cluster identifier and the information identifying the user to the trusted third party system 130. The trusted third party system 130 retrieves a verified age corresponding to the information identifying the user to the trusted third party system 130, and communicates the verified age, as well as verified ages of other users in the cluster corresponding to other information received by the trusted third party system 130, to the social networking system 140. Hence, the trusted third party system 130 may communicate an aggregation of verified ages of users included in a cluster corresponding to the cluster identifier to the social networking system 140. Providing the aggregation of verified ages of users in a cluster prevents communication of information personally identifying various users between the social networking system 140 and the trusted third party system 130.

The social networking system 140 determines 325 an accuracy of the asserted ages associated with various users in a cluster based on the verified ages received from the trusted third party system 130 and the asserted ages of users in the cluster maintained by the social networking system 140. In some embodiments, the social networking system 140 determines 325 the accuracy of asserted ages of users in a cluster as a percentage of asserted ages in the cluster matching verified ages received from the trusted third party system 130. The social networking system 140 determines 325 the accuracy of the asserted ages associated with users in the cluster as a percentage of users in the subset of the cluster having asserted ages matching verified ages from the trusted third party system 130. The social networking system 140 stores the determined accuracy in association with the cluster. Accuracies for each cluster are determined 325 and stored in association with the clusters by the social networking system 140, allowing the social networking system 140 to maintain a measure of the accuracies of asserted ages associated with users in various clusters.

When selecting content for presentation to a viewing user, the social networking system 140 may account for an accuracy of an age asserted by the viewing user. For example, the social networking system allows users or third party systems 130 to include accuracies of asserted ages associated with users as targeting criteria for content items in addition to an asserted age associated with the users. As an example, targeting criteria included in an ad request identifies an age range and a threshold accuracy of an asserted age associated with the viewing user, so the ad request is eligible for presentation to the viewing user if the asserted age associated with the viewing user is within the age range in the targeting criteria and the asserted age of the viewing user has at least the threshold accuracy.

In various embodiments, the social networking system 140 receives 330 a request to present a content item to one or more users based at least in part on an age of a viewing user presented with the content item. For example, targeting criteria associated with the content item specifies an age range and a threshold accuracy of an asserted age associated with the viewing user. When the social networking system 140 identifies an opportunity to present content to the viewing user, the social networking system 140 determines whether the content item is eligible for presentation to the user by identifying 335 a cluster including the viewing user and determines an accuracy associated with the cluster, which represents an accuracy of the asserted age provided to the social networking system 140 by the viewing user. In response to the accuracy of the cluster including the viewing user equaling or exceeding the threshold accuracy included in the targeting criteria, the social networking system includes 340 the content item in one or more selection processes for presentation to the user if characteristics of the viewing user satisfy at least a threshold number of targeting criteria associated with the content item. For example, the content item is associated with targeting criteria specifying an age range and a threshold accuracy of an asserted age, so the social networking system 140 includes 340 the content item in one or more selection processes selecting content for presentation to the viewing user if the accuracy associated with an identified cluster including the viewing user equals or exceeds the threshold accuracy of the asserted age and the age associated with the viewing user by the social networking system 140 (i.e., the viewing user's asserted age to the social networking system 140) is within the age range specified by the targeting criteria.

Alternatively, the social networking system 140 maintains a minimum accuracy of the viewing user's asserted age. If the viewing user's asserted age satisfies one or more targeting criteria associated with a content item, the social networking system 140 identifies 335 a cluster including the viewing user and compares the accuracy associated with the identified cluster to the minimum accuracy. If the accuracy associated with the identified cluster is less than the minimum accuracy, the social networking system 140 determines the viewing user's asserted age does not satisfy the one or more targeting criteria associated with the content item, which may make the content item ineligible for presentation to the user. However, if the accuracy associated with the identified cluster equals or exceeds the minimum accuracy, the social networking system 140 continues determining that the viewing user's asserted age satisfies the one or more targeting criteria associated with the content item.

While FIG. 3 describes determination of an accuracy of an age asserted to a social networking system 140 by a user of the social networking system 140, the method described in conjunction with FIG. 3 may be used to determine an accuracy of other characteristics asserted to the social networking system 140 by the user that correspond to verified characteristics maintained by a trusted third party system 130 and that have at least a threshold likelihood of being related to an additional characteristic. For example, for an asserted characteristic related to an additional characteristic maintained by the social networking system 140 for users, the social networking system 140 clusters users based on the additional characteristic, as described above conjunction with FIG. 3 (i.e., the additional characteristic in the example of FIG. 3 is the distribution of ages of other users connected to the user). As an example, the social networking system 140 generates a vector for various users, with one or more dimensions of the vector based on values of the additional characteristic. For each cluster, the social networking system 140 retrieves the verified characteristic for a subset of users in a cluster. By comparing the asserted characteristic of each user in the subset of users in the cluster to the verified characteristic of the user retrieved from the trusted third party system 130, the social networking system 140 determines an accuracy of the asserted characteristic of users in the cluster, as described above in conjunction with FIG. 3. The social networking system 140 stores the determined accuracy in association with the cluster and similarly determines accuracies associated for each cluster. The determined accuracies may be used along with the asserted characteristic when selecting content for presentation to users, as described above in conjunction with FIG. 3

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    accessing stored information describing a plurality of users of a social networking system, the information including, for each user, an asserted age of the user and a set of other users of the plurality of users with whom the user has established a connection in the social networking system;
    for each user of the plurality of users, determining a distribution of the ages of the other users with whom the user has established a connection;
    clustering the plurality of users into one of a plurality of clusters based on the determined distributions;
    for each of the plurality of clusters,
        receiving information from a trusted third party system describing a verified age of each of at least a subset of the users of the cluster,
        determining an accuracy of the cluster by comparing the asserted ages of the subset of users of the cluster to the verified ages of the subset of users, and
        storing the determined accuracy of the cluster;
    receiving a request to present a content item to one or more of the plurality of users based at least in part on an age of a viewing user;
    identifying the cluster to which the viewing user belongs; and
    including the content item in one or more selection processes selecting content for presentation to the viewing user based at least in part on an asserted age of the viewing user and the accuracy of the cluster to which the viewing user belongs.

2. The method of claim 1, wherein the request to present the content item to one or more of the plurality of users includes a threshold accuracy of the age of the viewing user.

3. The method of claim 2, wherein including the content item in one or more selection processes selecting content for presentation to the viewing user based at least in part on the asserted age of the viewing user and the accuracy of the cluster to which the viewing user belongs comprises:
    including the content item in the one or more selection processes in response to determining the accuracy of the cluster to which the viewing user belongs equals or exceeds the threshold accuracy and the asserted age of the viewing user satisfies the age of the viewing user included in the request.

4. The method of claim 3, wherein the asserted age of the viewing user satisfies the age of the viewing user included in the request in response to the asserted age of the viewing user being within an age range included in the request.

5. The method of claim 1, wherein including the content item in one or more selection processes selecting content for presentation to the viewing user based at least in part on the asserted age of the viewing user and the accuracy of the cluster to which the viewing user belongs comprises:
    including the content item in the one or more selection processes in response to determining the accuracy of the cluster to which the viewing user belongs equals or exceeds a minimum accuracy and the asserted age of the viewing user satisfies the age of the viewing user included in the request.

6. The method of claim 1, wherein clustering the plurality of users into one of a plurality of clusters based on the determined distributions comprises:
    creating a vector for each of the plurality of users, where each dimension in the vector for a user indicates a number of the other users connected to the user having an age within an age range; and
    clustering the plurality of users based at least in part on distances between the vectors.

7. The method of claim 1, wherein clustering the plurality of users into one of the plurality of clusters based on the determined distributions comprises:
    creating a vector for each of the plurality of users, where each dimension in the vector for a user indicates a percentage of the other users connected to the user having an age within an age range; and
    clustering the plurality of users based at least in part on distances between the vectors.

8. The method of claim 1, wherein determining the accuracy of the asserted ages of the subset of users of the cluster by comparing the asserted ages to the verified ages of the subset of users comprises:
    determining a percentage of users in the subset of users having asserted ages matching verified ages.

9. The method of claim 1, wherein receiving information from the trusted third party system describing the verified age of each of at least the subset of the users of the cluster comprises:
    communicating information identifying one or more users in the cluster to the trusted third party system along with a cluster identifier corresponding to the cluster; and
    receiving verified ages maintained by the trusted third party system for users corresponding to the communicated information in association with the cluster identifier from the trusted third party system.

10. A method comprising:
    accessing stored information describing a plurality of users of a social networking system, the information including, for each user, an asserted characteristic of the user and a set of other users of the plurality of users with whom the user has established a connection in the social networking system;

for each user of the plurality of users, determining a distribution of an additional characteristic associated with the user;

clustering the plurality of users into one of a plurality of clusters based on the determined distributions;

for each of the plurality of clusters,
receiving information from a trusted third party system describing a verified characteristic of each of at least a subset of the users of the cluster,
determining an accuracy of the cluster by comparing the asserted characteristic of the subset of the users of the cluster to the verified characteristic of the subset of the users of the cluster, and
storing the determined accuracy of the cluster;

receiving a request to present a content item to one or more of the plurality of users based at least in part on a value of the asserted characteristic of a viewing user;

identifying the cluster to which the viewing user belongs; and including the content item in one or more selection processes selecting content for presentation to the viewing user based at least in part on the asserted characteristic of the viewing user and the accuracy of the cluster to which the viewing user belongs.

11. The method of claim 10, wherein the request to present the content item to one or more of the plurality of users includes a threshold accuracy of the value of the asserted characteristic of the viewing user.

12. The method of claim 11, wherein including the content item in one or more selection processes selecting content for presentation to the viewing user based at least in part on the asserted characteristic of the viewing user and the accuracy of the cluster to which the viewing user belongs comprises:
including the content item in the one or more selection processes in response to determining the accuracy of the cluster to which the viewing user belongs equals or exceeds the threshold accuracy and the asserted characteristic of the viewing user satisfies the value of the asserted characteristic included in the request.

13. The method of claim 10, wherein including the content item in one or more selection processes selecting content for presentation to the viewing user based at least in part on the asserted characteristic of the viewing user and the accuracy of the cluster to which the viewing user belongs comprises:
including the content item in the one or more selection processes in response to determining the accuracy of the cluster to which the viewing user belongs equals or exceeds a minimum accuracy and the asserted characteristic of the viewing user satisfies the value of the asserted characteristic included in the request.

14. The method of claim 10, wherein clustering the plurality of users into one of the plurality of clusters based on the determined distributions comprises:
creating a vector for each of the plurality of users, where each dimension in the vector for a user indicates a value of the additional characteristic; and
clustering the plurality of users based at least in part on distances between the vectors.

15. The method of claim 10, wherein the asserted characteristic comprises an asserted age and the additional characteristic comprises ages of other users connected to the user via the social networking system.

16. A computer program product comprising a computer readable storage medium having instructions encoded thereon that, when executed by a processor, cause the processor to:
access stored information describing a plurality of users of a social networking system, the information including, for each user, an asserted age of the user and a set of other users of the plurality of users with whom the user has established a connection in the social networking system;

for each user of the plurality of users, determine a distribution of the ages of the other users with whom the user has established a connection;

cluster the plurality of users into one of a plurality of clusters based on the determined distributions;

for each of the plurality of clusters,
receive information from a trusted third party system describing a verified age of each of at least a subset of the users of the cluster,
determine an accuracy of the cluster by comparing the asserted ages of the subset of users of the cluster to the verified ages of the subset of users, and
store the determined accuracy of the cluster;

receive a request to present a content item to one or more of the plurality of users based at least in part on an age of a viewing user;

identify the cluster to which the viewing user belongs; and include the content item in one or more selection processes selecting content for presentation to the viewing user based at least in part on an asserted age of the viewing user and the accuracy of the cluster to which the viewing user belongs.

17. The computer program product of claim 16, wherein the request to present the content item to one or more of the plurality of users includes a threshold accuracy of the age of the viewing user.

18. The computer program product of claim 17, wherein include the content item in one or more selection processes selecting content for presentation to the viewing user based at least in part on the asserted age of the viewing user and the accuracy of the cluster to which the viewing user belongs comprises:
include the content item in the one or more selection processes in response to determining the accuracy of the cluster to which the viewing user belongs equals or exceeds the threshold accuracy and the asserted age of the viewing user satisfies the age of the viewing user included in the request.

19. The computer program product of claim 18, wherein the asserted age of the viewing user satisfies the age of the viewing user included in the request in response to the asserted age of the viewing user being within an age range included in the request.

20. The computer program product of claim 16, wherein include the content item in one or more selection processes selecting content for presentation to the viewing user based at least in part on the asserted age of the viewing user and the accuracy of the cluster to which the viewing user belongs comprises:
include the content item in the one or more selection processes in response to determining the accuracy of the cluster to which the viewing user belongs equals or exceeds a minimum accuracy and the asserted age of the viewing user satisfies the age of the viewing user included in the request.

* * * * *